(12) United States Patent
Shakkarwar

(10) Patent No.: US 7,392,411 B2
(45) Date of Patent: Jun. 24, 2008

(54) SYSTEMS AND METHODS FOR DYNAMIC VOLTAGE SCALING OF COMMUNICATION BUS TO PROVIDE BANDWIDTH BASED ON WHETHER AN APPLICATION IS ACTIVE

(75) Inventor: Rajesh G. Shakkarwar, Cupertino, CA (US)

(73) Assignee: ATI Technologies, Inc., Markham, Ontario (CA)

( * ) Notice: Subject to any disclaimer, the term of this patent is extended or adjusted under 35 U.S.C. 154(b) by 750 days.

(21) Appl. No.: 10/423,290

(22) Filed: Apr. 25, 2003

(65) Prior Publication Data

US 2004/0215986 A1 Oct. 28, 2004

(51) Int. Cl.
*G06F 1/32* (2006.01)

(52) U.S. Cl. ........................... 713/320; 710/104
(58) Field of Classification Search ............. 710/104; 713/300, 320
See application file for complete search history.

(56) References Cited

U.S. PATENT DOCUMENTS

| | | | | |
|---|---|---|---|---|
| 5,423,009 A * | 6/1995 | Zhu | .................. | 710/307 |
| 5,630,163 A * | 5/1997 | Fung et al. | .................. | 710/307 |
| 6,072,334 A * | 6/2000 | Chang | .................. | 326/82 |
| 6,453,374 B1 * | 9/2002 | Kovalan et al. | .................. | 710/100 |
| 6,535,945 B1 * | 3/2003 | Tobin et al. | .................. | 710/305 |
| 6,754,129 B2 * | 6/2004 | Khatri et al. | .................. | 365/226 |
| 7,096,377 B2 * | 8/2006 | Kumar et al. | .................. | 713/600 |
| 2002/0120878 A1 * | 8/2002 | Lapidus | .................. | 713/300 |

OTHER PUBLICATIONS

F. Worm, P. Ienne, P. Thiran, and G. De Micheli, "An adaptive low-power transmission scheme for on-chip networks," International Symposium on System Synthesis, pp. 92-100, 2002.*
L. Shang, L. Peh, and N. K. Jha, "Power-efficient interconnection networks: Dynamic voltage scaling with links," IEEE Computer Architecture Letters, vol. 1, No. 5, 2002.*
G.-Y. Wei, J. Kim, D. Liu, S. Sidiropoulos, and M. A. Horowitz, "A variable-frequency parallel I/O interface with adaptive power-supply regulation," IEEE Journal of Solid-State Circuits, vol. 35, No. 11, Nov. 2000.*

* cited by examiner

*Primary Examiner*—Chun Cao
*Assistant Examiner*—Albert Wang

(57) ABSTRACT

Systems and methods for dynamic power management of electronic devices are disclosed. In one form, a system employing dynamic power management for electronic devices includes a central processing unit operable to process information via a communication bus. The system includes a clock generator and a voltage generator coupled to the processing unit and operably associated with the communication bus having multiple operating voltage levels. The clock generator and communication bus are operated at variable clock rates and voltage levels to ensure bandwidth requirements are satisfied for communicating and processing information. In this manner, power consumption of the system may be dynamically managed while providing sufficient bandwidth for the system.

25 Claims, 5 Drawing Sheets

SYSTEMS AND METHODS FOR DYNAMIC VOLTAGE SCALING OF COMMUNICATION BUS TO PROVIDE BANDWIDTH BASED ON WHETHER AN APPLICATION IS ACTIVE

FIELD OF THE DISCLOSURE

The present invention generally relates to efficient use of electronic devices and, more particularly, to systems and methods for power management of electronic devices.

BACKGROUND

Technological advancements for electronic devices having components such as microprocessors, data buses, memory, and associated electronic circuitry have warranted careful design considerations in terms of power consumption. Historically, microprocessor speeds have doubled every eighteen months to two years necessitating information to be communicated between devices at increased data rates.

However, power consumption of electronic components associated with processing and transmitting information at such high speeds has also increased. For example, power consumption of capacitive components, such as modes of a data bus, may be calculated based on the response of such components to changes in frequency. For example, capacitive reactance may be found by:

$$Xc = \frac{1}{\omega C} \quad \text{(Equation 1)}$$

Where $\omega$ is $2\pi$ times the frequency $f$ of a signal and C is the DC capacitive value for the component. The average current for a capacitor can be found by:

$$1 = \frac{V}{Xc} \quad \text{(Equation 2)}$$

Where V is the average voltage of the signal provided. Plugging these values into a power equation results in:

$$P = IV \quad \text{(Equation 3)}$$

As such, average power consumption for a capacitor increases proportionally as the frequency of the signal increases. For example, if a system's frequency is doubled, the power consumed by the capacitor also doubles, resulting in increased power consumption.

Some current solutions for efficiently managing power consumption include providing sleep states for electronic devices such as laptop computers, desktop systems and/or monitors. For example, a laptop computer benefits from reduced power consumption by reducing its operating frequency and/or operating voltage based on whether it is connected to a persistent power source, such as a wall plug, or a degenerative power source, such as a rechargeable power unit. Other applications for managing power consumption include providing reduced power states including powering down peripheral components such as video monitors, printers, etc. to conserve energy consumption. For example, such conventional energy conserving applications may include a mode of operation in which all unnecessary components are shut down or placed in a sleep mode and may include shutting down the video monitor and disk drive. Once awakened, the computer returns to an operating state.

As conservation of power, and battery life, remain desirable, other systems and methods for reducing power consumption will continue to be useful.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE FIGURES

Figure 1:
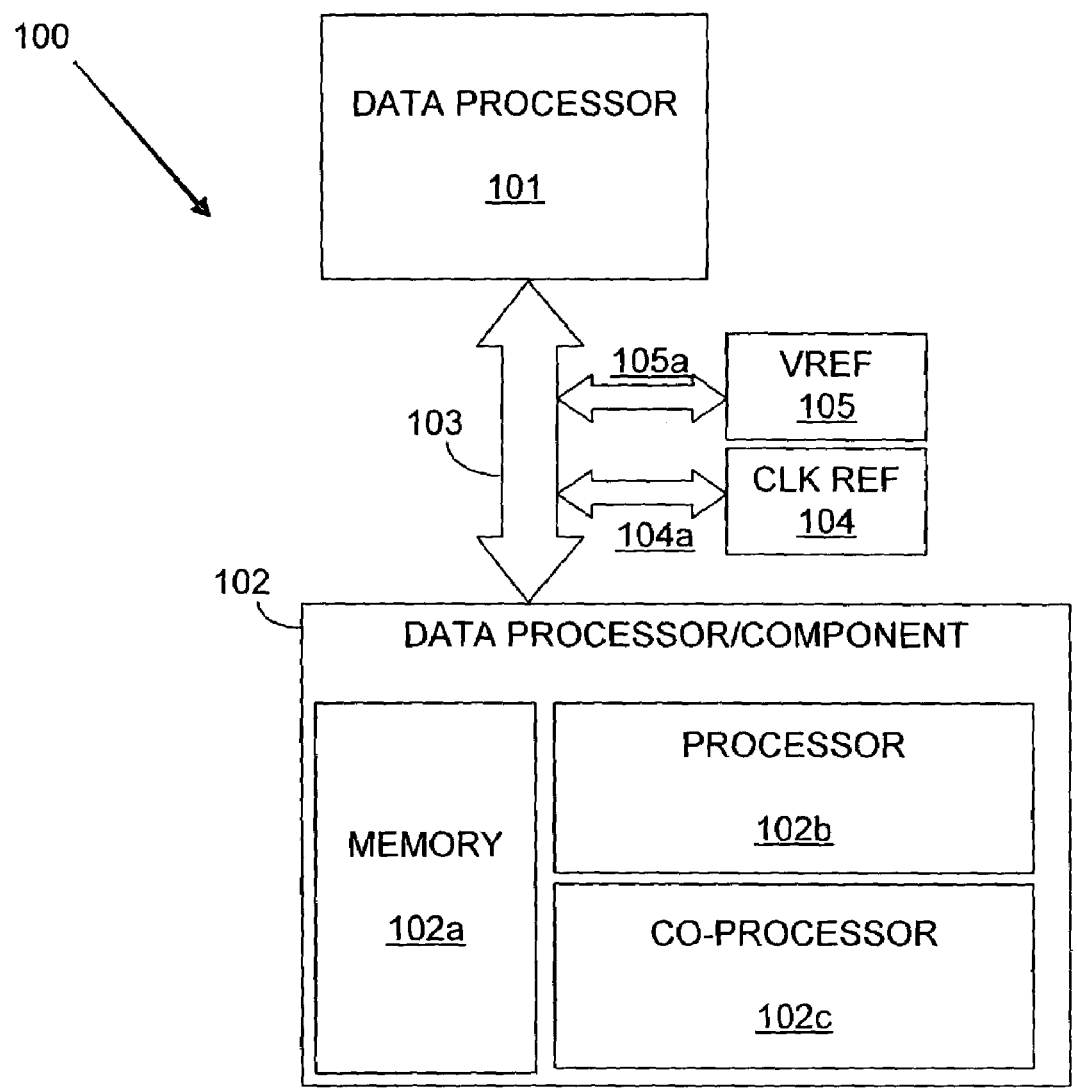
FIG. 1 is a block diagram of a system employing a monitor for determining bandwidth requirement for optimizing power consumption of electronic devices according to one embodiment of the invention.

Advantageous embodiments of the invention provide systems and methods for dynamic power management of electronic devices. The conceptual groundwork for the invention relates to managing power consumption of electronic devices while satisfying bandwidth requirements for communicating and/or processing information. In one form, bandwidth requirements may be satisfied through altering an operating voltage level of one or more electronic components or devices. Voltage levels may be varied in a step-wise linear manner to meet power requirements of the electronic device to while provide sufficient bandwidth for communicating information. During low-level bandwidth periods, voltage levels may be reduced to meet bandwidth requirements and reduce power consumption of electronic devices during low-level bandwidth periods.

In another form, an electronic device employs one or more clocks for latching signals at components associated with the electronic device. A clock's speed is an indicator of the number of cycles per second during which data can be latched and processed. Clock speed is usually measured in GHz (gigahertz, or trillions of pulses per second). By monitoring an operating condition, such as the needed data bandwidth between two or more components, the clock speed at which data is transferred (data rate) between components can be controlled to optimize power consumption. For example, the needed data rate between components can be monitored as part of a start up routine, or during normal operation to insure bandwidth requirements are satisfied while power consumption is minimized. In this manner, data rates between components or electronic devices can be matched to meet the bandwidth needed without sacrificing performance.

In a particularized form, a computer system includes a monitor operable to ensure bandwidth requirements are satisfied for one or more communication buses. One or more electronic devices may be coupled to a communication bus and a data rate for the communication or data bus may be determined based on the one or more connected electronic devices. An operating characteristic for the data bus is determined and altered based on the required bandwidth. For example, a voltage level and/or clock for the communication bus may be altered to satisfy the bandwidth requirements needed to communicate information via the bus. In one embodiment, a Universal Serial Bus (USB) may be used to couple USB compliant devices during operation of a computer system. Each electronic device may include bandwidth requirements and an operating characteristic of the USB and/or data bus coupling the USB to the system may be altered to satisfy the required bandwidth. Additionally, if the USB device is disconnected or not being used, an operating characteristic of the USB and/or data bus connecting the USB to the system may be altered to reduce power consumption. In this manner, power consumption associated with communicating and processing information via data buses may be optimized while satisfying bandwidth requirements for the computer system. This is further illustrated with respect to FIGS. 1-5.

FIG. 1 is a block diagram of a system 100 operable to process and communicate information using one or more clocked signals, according to one embodiment of the invention.

Electronic device 100 includes a first processor 101 communicatively coupled to a second processor 102 via communication (data) bus 103. Communication bus 103 operates as a transmission path on which signals are communicated via one or more data paths interconnecting first processor 101 to second processor 102. Specific examples of processors include: general purpose processing devices, such as microprocessors and microcontrollers; and specialized processing devices, such as graphics devices, audio devices, network interface devices, and input output devices.

Control logic 104 provides access to operating voltage levels provided by voltage generator 105 and clock speeds provided by clock generator 106 and suited to satisfy bandwidth requirements of bus 103 to communicate information between first processor 101 and second processor 102. Clock generator 106 provides timing for system 100, which may include a common clock or separate clocks for each of component within system 100. For example, a data rate for data bus 103 is established using clock generator 106 based on bandwidth needed to satisfy communication of information using bus 103.

Similarly, control logic 104 may alter operating voltage levels Vcore a-j 107 and/or Vcore k-p 108 in response to bandwidth required to satisfy communicating information. For example, data bus 103 may be operated at a higher voltage level during increased communication periods and may also be operated at lower voltage levels during low bandwidth communication periods. As such, voltage levels may be altered based on bandwidth requirements thereby reducing energy consumed through operating electronic devices at higher voltage levels.

Although references 106, 107 and 108 are illustrated as a single voltage level references, it should be understood that each of first processor 101, second processor 102 and/or bus 103 may include separate voltage reference sources that may be altered based on bandwidth requirements. For example, in one embodiment, the logic core portions (not expressly shown) of first processor 101 and/or second processor 102 can receive a power supply voltage of a first level, while driver portions (not expressly shown) of first and second processors 101 and 102, which may include bus drivers, could receive a separate power supply voltage level such as an Input/Output voltage level (VIO).

Processing conditions of system 100 are monitored by control logic 104 to ensure efficient use of bandwidth is maintained while minimizing power consumption. For example, bus 103 may be designed to handle a maximum defined data rate between first processor 101 and second processor 102. The maximum defined data rate will be dependent upon the amount of data each processor needs to transfer information between first and second processor 101 and 102. The amount of bandwidth needed between first and second processor 101 and 102 can be reduced during low communication and/or processing periods. By reducing the data rate of bus 103 less data is transferred and power savings may be realized without sacrificing performance or powering down electronic devices, processors, components, etc. This is better described with reference to FIG. 2.

Figure 2:
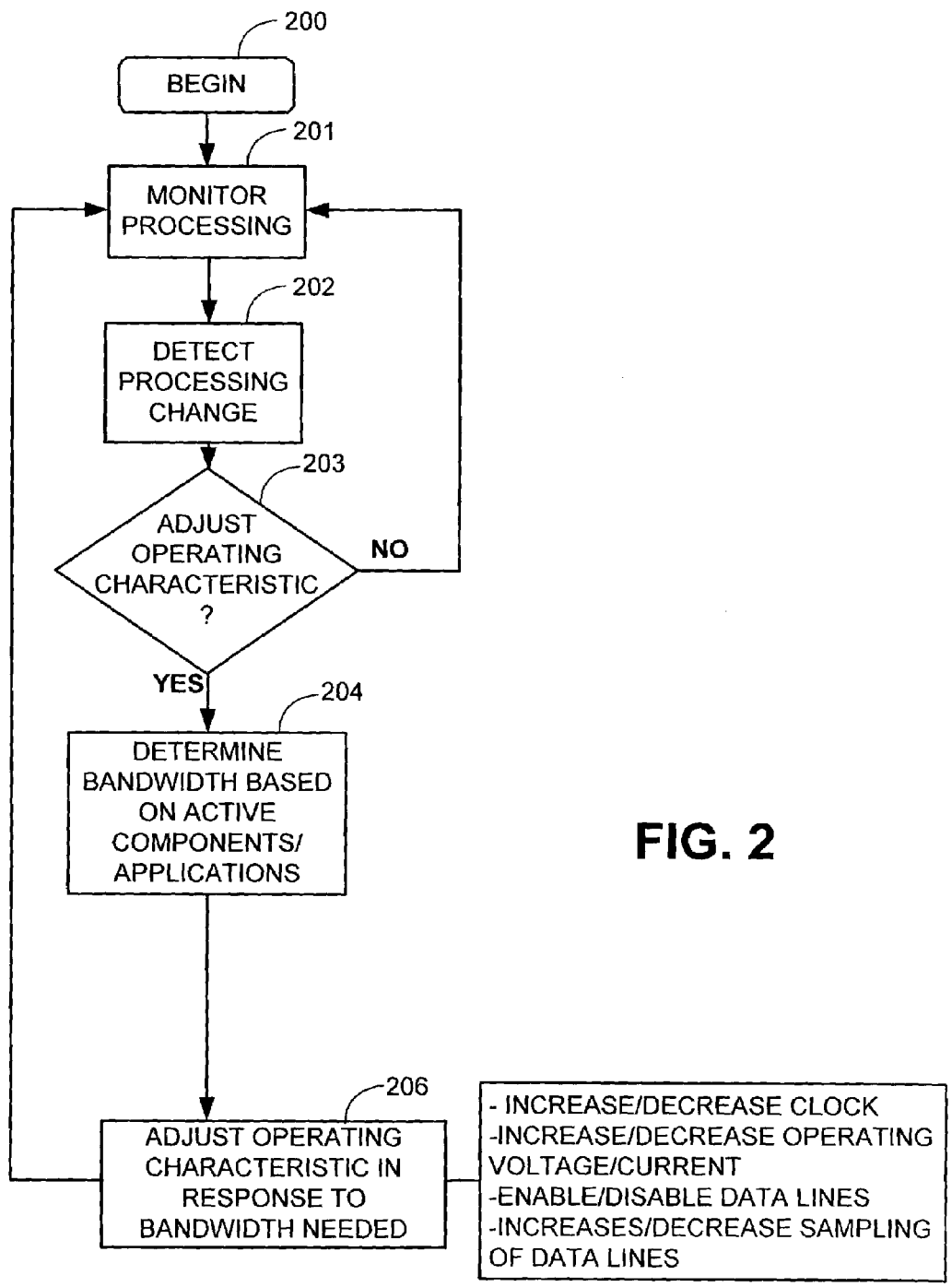
FIG. 2 illustrates a flow diagram of a method for altering operating characteristics of a communication bus according to one embodiment of the invention.

FIG. 2 illustrates a flow diagram of a method for altering operating characteristics of a communication bus according to one embodiment of the invention.

The method begins generally at 200. Bandwidth for a communicating and/or processing information is determined 201 based on a requirements for communicating information via a communication bus. For example, bus 103 of FIG. 1 may be coupled between a first processor such as a data controller and a memory device. A process intensive operation may be employed by the processor requiring increased memory capacity and bandwidth to service the operation. As such, bandwidth required to facilitate the operation is determined and a voltage level associated with communicating information between the processor and the memory over the data bus is altered to accommodate the resource intensive process 202. For example, an Input/Output voltage (VIO) of a data bus may be adjusted from 0.5 volts to 1.5 volts to accommodate the increased bandwidth requirements. Similarly, upon the resource intensive process being finished, the voltage level may be reduced during processing and communication periods that do not warrant high bandwidth capacity.

Upon adjusting the voltage level based on the bandwidth requirements, a clock associated with providing timing for communicating and/or processing information may be adjusted if required. For example, if the voltage level is reduced and there still exists an excess amount of bandwidth for communicating information, then a clock associated with communicating information via the communication bus may be reduced to a level sufficient to communicate information. For example, a clock may be decreased from 133 MHz to 66MHz. As such, an additional power savings will be realized given that electronic devices consume energy as a function of the frequency of operation. Similarly, if additional bandwidth is needed to communicate and/or process information, a clock associated with the data bus may be increased to a level to satisfy the bandwidth requirement. In this manner, an operating characteristic of the communication bus may be altered to satisfy bandwidth requirements while conserving energy without having to power down/power up individual components, alter operating modes of devices, or alter power states of electronic devices to reduce power consumption within systems.

If a device or process is altered 204, the method proceeds to determine if additional bandwidth is needed 201 or the method maintains a voltage level and a clock until a change in processing or devices is detected.

Figure 3:
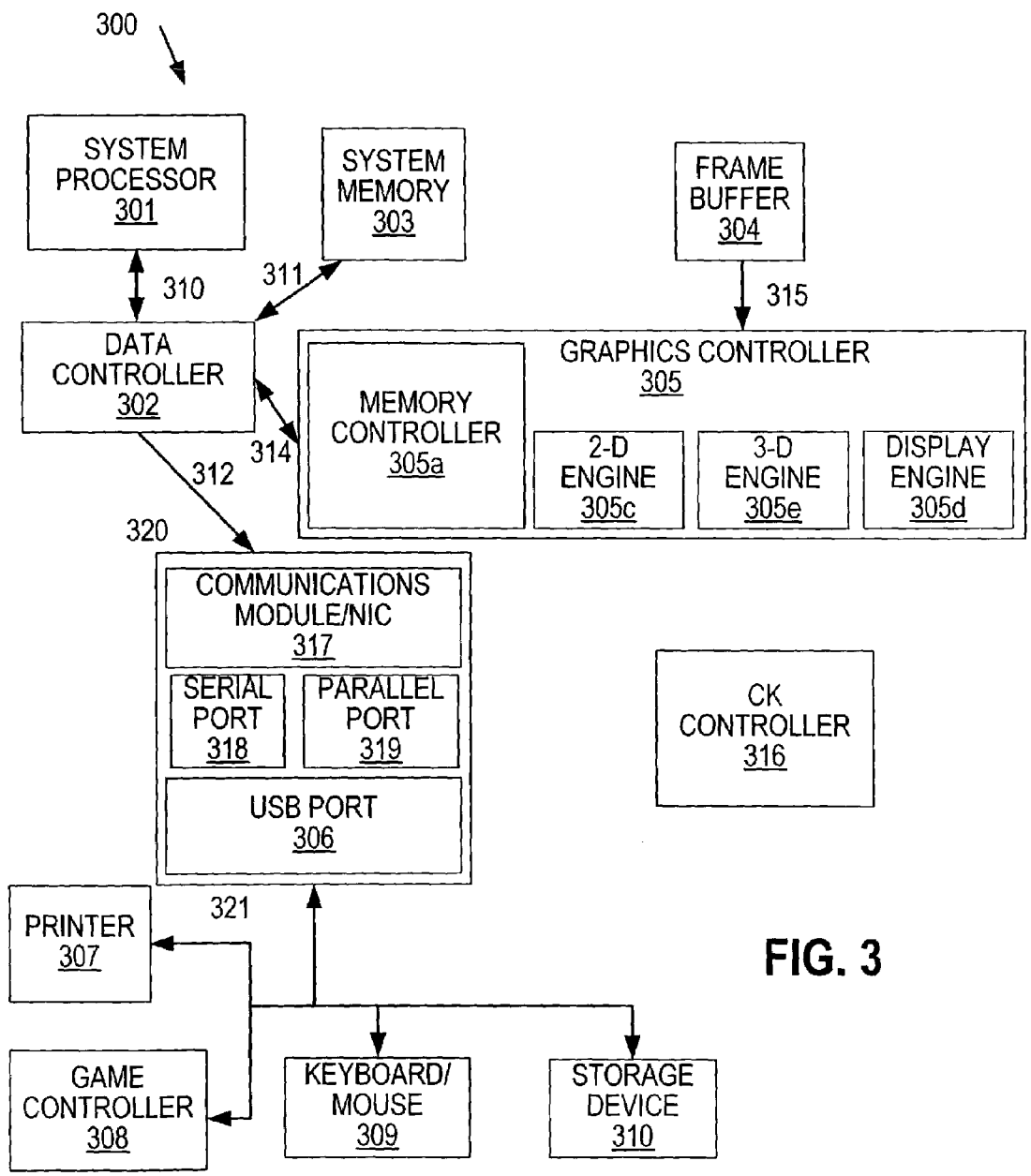
FIG. 3 illustrates a block diagram of a system employing multiple communication buses having associated bandwidths for communicating information according to one embodiment of the invention.

FIG. 3 illustrates a block diagram of a system 300 that includes a system processor 301, data controller 302, system memory 303, Input Output (IO) device 320, graphics controller 305, frame buffer memory 304, and USB (Universal Serial Port) devices 307-310. IO device 320 further provides for connectivity to a Local Area Network (LAN) such as an Intranet and/or a Wide Area Network (WAN) such as the Internet 325. A Hard Disk Drive (HDD) controller 318 is coupled to IO device 320 allowing for access to a Hard Disk Drive (HDD) 327. Audio/Modem controller 319 provide input and output audio signals via microphone 323 and speaker 322 respectively.

System processor 301 is connected to data controller 302 through data connection 310. System memory 303 is connected to data controller 302 through data connection 311. IO device 320 is connected to data controller 302 through data connection 312. Graphics controller 305 is connected to data controller 302 through data connection 314. Frame buffer 304 is connected to graphics controller 305 through connection 315. USB devices are connected to the IO device 320 through data connection 321. LAN/WAN 325 is connected to the IO device 320 through data connection 331. HDD controller 326 is connected to the IO device 320 through data connection 329. Audio I/O controller 328 is connected to the IO device 320 through data connection 330. The data connections are generally used to communicate information and appropriate control information, such as address signals, between devices and/or modules. Clock/voltage control 316 provides operating characteristics for each of system processor 301, data controller 302, IO device 320, and graphics controller 305. Clock and voltage levels of each processor, device, and or controller are alterable based on bandwidth requirements for communicating and processing information.

Each of data connection 310-315, 321, 329, and 331 is designed to support a maximum data rate specified by a desired performance level. For example, data connection 312 needs to be able to support a data rate that is the aggregate of the individual data rates needed by each of the modules of IO device 320 (i.e., NIC module 317, serial port module 318, Parallel port module 319, and USB port module 306). For example, if each of the modules of IO device 320 needs to transmit 10 Megabits of data/second to operate within a defined manner, data connection 312 would need to be able to transmit 40 megabits of data/second to guarantee proper operation of each of the modules at its specified rate.

In one embodiment, the processing condition of system 300 is monitored by clock/voltage control 316 to determine when one or more portions of system 300 are not used and an operating characteristic of an associated data connection can be altered to assure proper operation. For example, if USB module 306 is not being used (i.e. no USB devices are coupled to USB 306), the data rate of data connection 312 may be reduced by an amount equal to bandwidth needed to support the USB module 306 without effecting performance of system 300.

In one embodiment, one or more device may be coupled to USB module 306 and bandwidth requirements for each device may be determined. USB module 306 allows for "hot swap" or "plug-and-play" functionality and includes a USB controller (not expressly shown) operable to detect the presence of an electronic device. For example, USB module 306 may access a look-up table stored within a memory device of the device, IO device 320, USB 306, and/or system 300 and operable to provide device identification and associated operating characteristics of each connected device. As such, system 100 used in associated with USB module 306 may determine the required bandwidth needed to support the connected device and alter an operating characteristic such as a voltage level and/or clock to support providing bandwidth for the electronic device and bus 310-315, 321, 329, and 331 accordingly. As such, one or more electronic device may be connected to system 300 during operation and bandwidth requirements for the device may be satisfied without requiring initialization of system 300, powering down of system 300 thereby allowing for real-time allocation of bandwidth and power management of system 300.

Likewise, with respect to the graphic controller 305, if the 3-D engine 305e is not being used, i.e. no application is using the 3-D engine 305e, the data rate and/or power level of bus 315 between graphics controller 305, and frame buffer 304 can be reduced significantly, since 3-D graphics operations are very memory intensive resulting in a significant power savings. Accordingly, if 3-D graphics are not being performed, the data rate between the data controller 302 and graphics controller 305 can also be reduced, further saving power.

Busses that support modules associated with real time applications, or modules having fixed data rates, are ideally suited for having their data rate reduced to save power, since their data rates can be reduced without effecting system performance. For example, if an operating characteristic of bus 315 is reduced because 3-D engine 305e is not being used, the performance of system 300 is not effected, 2-D engine 305c of graphics controller 305 may not operate any better, since 2-D engine 305c needs to operate fast enough to enable a real-time function (generating a specific number of graphics frames per second). Once the bus rate is fast enough to enable the real-time function any additional bandwidth is generally not needed or useful.

In a similar manner, if a specific IO function having a fixed data rate, such as USB bus support, is not needed, the date rate between the controller 320 and the data controller 302 can be reduced without effecting performance of other modules of system 300.

Figure 4:
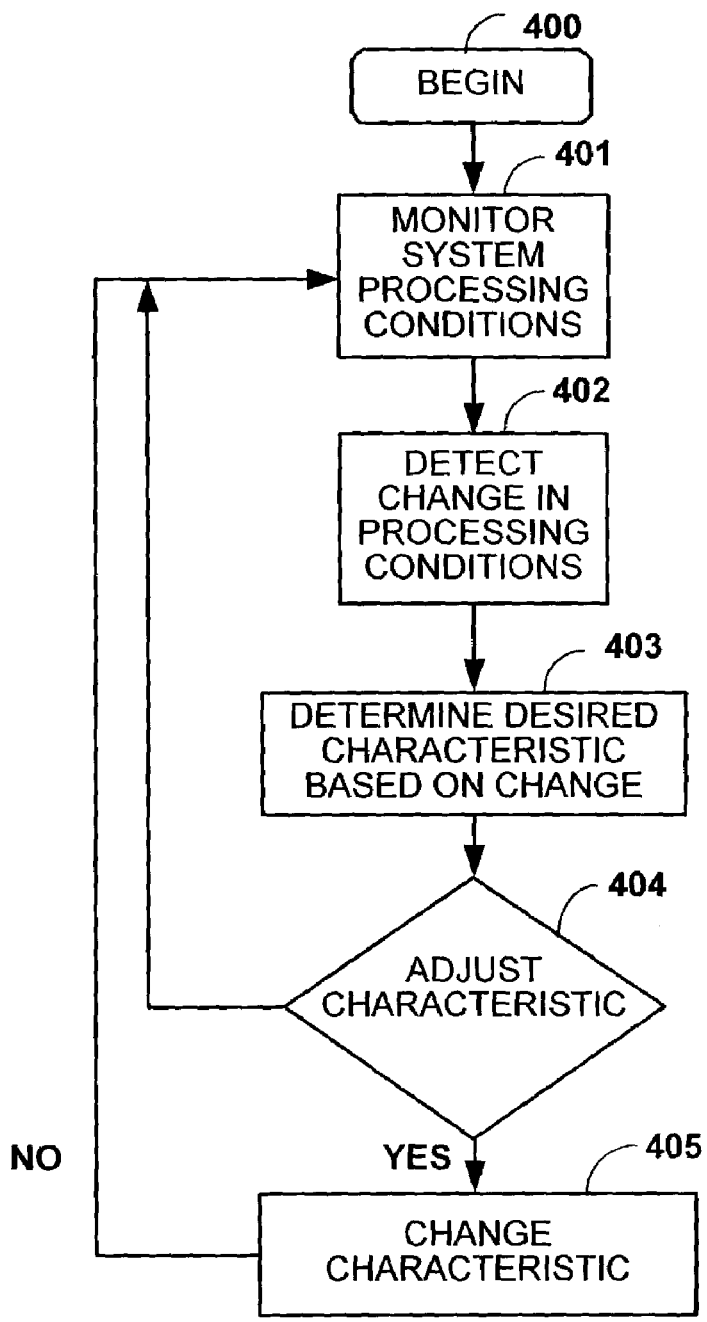
FIG. 4 is a flow diagram of a method for managing power consumption within a computer system operable to couple plural electronic devices having associated bandwidth requirements according to one embodiment of the invention.

FIG. 4 illustrates a specific method in accordance with one embodiment of the present invention. The method may be employed within a program of instructions embodied within a computer readable medium, a memory device, encoded logic, or other devices operable to use a portion or all of the method illustrated in FIG. 4.

The method begins generally at step 400. At step 401, bandwidth for a component is monitored for increasing or decreasing communication requirements. Note, during start up, all devices can be monitored for initial communication requirements. Monitoring of the components' data rate requirements can be accomplished by monitoring application usage, polling specific modules, reading specific registers, and receiving interrupts.

For example, when an application that is known to use 3-D graphics is opened, system software can determine if the bus rate between the data controller and the graphics controller is high enough to support the graphics requirements. Likewise, system software can determine if the data rate between a graphics controller and its frame buffer is high enough to support 3-D graphics. The determination of current data rates can be accomplished by polling specific devices, such as registers associated with clock generation devices that control the specific data rates.

In an alternate embodiment, the graphics controller can have control logic, for example in the memory controller 305a of FIG. 3, that monitors whether specific portions of the graphics controller are being used.

The method of FIG. 4 proceeds to step 402 when a change in processing condition is detected. For example, a change in processing conditions occurs during system start up, or when any one of a number of modules are added or removed from use during operation. A module can be considered added or removed when it becomes either enabled/disabled. For example, when a specific module is not used for a specific amount of time, a timeout can occur indicating that the module does not need its dedicated bandwidth since it is idle.

Upon detecting a change in processing, the method determines bandwidth 403 for an associated data connection based on the active components. For example, a look-up table may include a list of clock speeds, and/or voltage levels required to process information for specific devices and/or groups of devices. Additionally, bandwidth requirements associated with using a component, hardware, device, etc. may be empirically calculated by knowing the required data bandwidth of each device. For example, a first module of a device requiring 20 Megabits of data and a second module of the device requiring 10 Megabits of data will require a data connection rate of 30 Megabits when both are active simultaneously.

Upon determining bandwidth needed based on active components/applications, the method proceeds to step 404 where a determination is made whether a specific characteristic, such as the data rate or the voltage level of a data bus, should be modified. Generally, the characteristic will be modified if the needed bandwidth determined at step 403 is significantly different than the current data rate. If it is determined that no characteristic is to be changed, flow proceeds to step 401. Otherwise the flow proceeds to step 405.

At step 405, the data rate of a data connection is adjusted. In one embodiment, the data rate can be adjusted by adjusting operating of a clock generation device responsible for the data rate being adjusted. For example, a register associated with a phase-locked-loop can be written to by system software, or other controller logic. In another embodiment, the voltage level asserted onto the data connection, such as an input/output voltage (VIO), is modified. For example, when a data rate over a data connection is reduced, it may be possible to also decrease the voltage level of the asserted data. One embodiment may include reducing an operating voltage level from 1.4 volts to 1.0 volt and/or reducing a clock from 66 MHz to 33 MHz.

In yet another embodiment of the present invention, the operating characteristic modified may include altering the number of data lines being used. For example, increasing or decreasing the bandwidth of a device and/or system may include enabling or disabling data lines associated with a communication bus during periods of increased/decreased processing and/or communication of information. For example, a sixty-four bit communication bus may be reduced to a thirty-two bit communication bus thereby providing a relative decrease in bandwidth, resulting in a decrease in power consumption.

Upon changing the operating characteristic and satisfying system bandwidth, the method proceeds to step 401 where the method continues to monitor the system's processing conditions.

Figure 5:
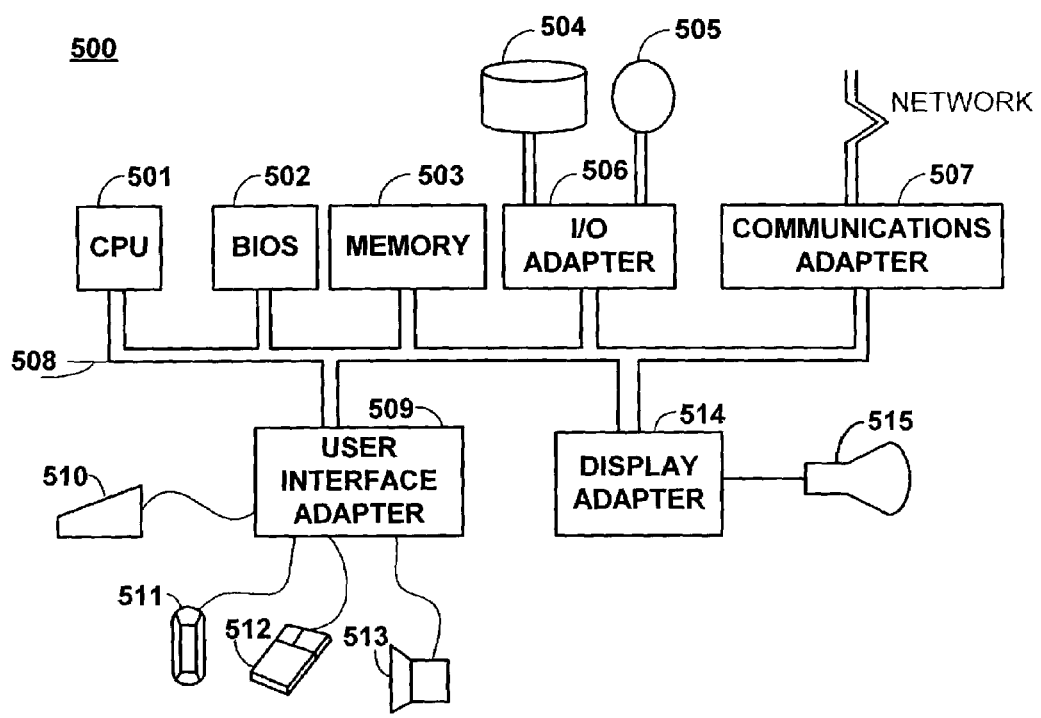
FIG. 5 illustrates a block diagram of a computer system employing dynamic power management according to one embodiment of the invention.

Referring to FIG. 5, a block diagram of a computer system illustrative of one embodiment of the present disclosure is shown. A system, indicated generally at 500, includes a central processing unit (CPU) 501 connected via at least one bus 508 to a basic input output system (BIOS) firmware 502, and memory, such as RAM, ROM, EEPROM, and any other memory devices, collectively designated by reference numeral 503. System 500 further includes an input/output adapter 506 for connecting peripheral devices such as SCSI drives 504 and RAID drives 505, and a display adapter 514 for connecting a display device 515 such as a Flat Panel Display (FPD) or a Cathode Ray Tube (CRT). A user interface adapter 509 is provided for connecting a keyboard 510, a mouse 512, a speaker 513, a microphone 511, and/or other user interface devices such as game controllers, touch pads, etc. System 500 also includes a communications adapter 507 for connecting system 500 to an information network such as an Intranet or the Internet.

BIOS firmware 502 includes a built-in software program, referenced generally as BIOS, accessible to system 500. The BIOS includes instructions for controlling the system's devices and testing memory. During operation, when system 500 is initially powered up, CPU 501 activates the BIOS. The BIOS runs a series of tests using a power on self test (POST) routine that initializes the system's hardware, chip registers, disk drives, power management, I/O ports and any other device requiring initialization by a POST routine.

A processing condition, such as an operating mode, of one or more electronic components and/or software applications for system 500 may be detected by an operating system or application associated with system 500. An operating characteristic of one or more data connections may be altered to increase or decrease a bus speed or data rate and power consumption for a communication bus. For example, a clock speed, voltage level, or bus width associated with operating an electronic device or executing a software application can be altered. System 500 may include a look-up table or database identifying components and associated processing bandwidths needed during operation to process information. Each device coupled to system 500 and operable to impact bandwidth use may be included within the look-up table or database. As such, an operating mode for one or more devices may be determined based on processing and a look-up table or database may be accessed to determine the amount of bandwidth needed to satisfy bandwidth requirements and maintain efficient operation of system 500.

In one embodiment, one or more electronic devices, modules, components, etc. associated with system 500 may include an associated operating table stored within a memory. A system monitor may access the a look-up table associated with each electronic device and store operating conditions for each electronic device within a master table. As an operating status for each device is altered, the master table may be updated to reflect the change in operation of each device and an operating characteristic of associated electronic devices and components may be altered accordingly to reflect the change. In this manner, aggregated information for electronic devices and components and associated bandwidths may be determined and stored in a master table allowing for dynamically managing power consumption of system 500 based on processing requirements and bandwidth needed for each electronic device and/or component.

As such, reduced power consumption attributed to operating a communication bus and/or one or more electronic components and/or electronic devices at lower clock speed(s) and voltage level(s) based on required bandwidth for processing information may be realized thereby decreasing the overall power consumption of associated electronic components and devices with minimal effect on overall processing bandwidth.

Although the disclosed embodiments have been described in detail, it should be understood that various changes, substitutions and alterations could be made to the embodiments without departing from their spirit and scope.

What is claimed is:

1. A system comprising:
   a communication bus operable to communicate information;
   control logic configured to determine a bandwidth for the communication bus based on whether an application is active;

an operating characteristic associated with the communication bus and alterable in response to the bandwidth to communicate the information via the communication bus; and a first variable reference voltage generator coupled to the control logic and operable to be altered based on the bandwidth to provide an operating voltage level of the communication bus.

2. The system of claim 1 further comprising a first variable clock generator operably associated with the communication bus and the control logic, the clock generator operable to provide a clock for the communication bus, the clock having a frequency based on the bandwidth.

3. The system of claim 1 further comprising:
a first component coupled to a first portion of the communication bus and operable to communicate the information;
a second component coupled to a second portion of the communication bus; and
wherein the control logic is further configured to determine the bandwidth based on a type of the first component and a type of the second component.

4. The system of claim 1 further comprising an operating characteristic for each of the first component and the second component, the operating characteristics stored within a memory associated with the communication bus for determining a voltage level and a clock level to provide the bandwidth.

5. The system of claim 4 wherein the first component comprises a data controller unit and the second component comprises an IO device.

6. The system of claim 4 wherein the first component comprises a data controller and the second component comprises a graphics device.

7. The system of claim 4 wherein the first component comprises a graphics device module and the second component comprises a memory device.

8. The system of claim 1 wherein the operating characteristic includes a voltage level between 0.5 volts and 5.0 volts.

9. The system of claim 8 wherein the operating characteristic includes a first operating characteristic providing a clock having a frequency less than 100 GHz and a second operating characteristic providing a clock having a frequency greater than 33 MHz.

10. A method comprising:
determining a first bandwidth needed to support communicating information between one or more electronic devices based on whether an application is active, the one or more electronic devices including a first electronic device;
determining an operating characteristic of first electronic device; and
altering the operating characteristic of communication bus configured to communicate the information to provide an operating level sufficient to provide the bandwidth, wherein altering the operating characteristic includes altering an operating voltage level and a clock associated with the communication bus.

11. The method of claim 10 further comprising:
detecting a second bandwidth in response to a change in bandwidth needed to support communicating the information based on a change in activity of the first application; and
altering the operating characteristic to provide the second bandwidth.

12. The method of claim 10 further comprising:
detecting a coupling of a second electronic device to the communication bus;
determining a second bandwidth needed to support both the first electronic device and the second electronic device; and
altering the operating characteristic to support the second bandwidth.

13. The method of claim 10 further comprising:
accessing a file including an operating characteristics and status of the one or more electronic devices; and
determining a second bandwidth based on the operating characteristics and status of the one or more electronic devices; and
altering the operating characteristic to support the second bandwidth.

14. The method of claim 13 wherein the operating characteristic comprises a voltage level.

15. The method of claim 10 further comprising:
altering an operating state of a graphics processor;
determining a second bandwidth based on the altered operating state; and
altering the operating characteristic to support the second bandwidth.

16. A system comprising:
a processor operable to process information communicated via a communication bus, the communication bus including a multi-state operating level to support communicating the information;
a memory device including a reference identifying an alterable operating voltage of the communication bus to provide sufficient bandwidth to communicate the information,
a clock generator operably associated with the processor and the communication bus and a clock reference stored within the memory relative to the operating voltage reference and alterable to provide the bandwidth, the clock reference based on whether the first application is active.

17. The system of claim 16 further comprising:
a data controller coupled to the processor and the memory device, the data controller including a first communication bus coupled to the processor and a second communication bus coupled to the memory device; and
the first and second communication buses operable to employ variable voltage levels and clock speeds for communicating the information.

18. The system of claim 16 further comprising a bandwidth dependent voltage generator operable to provide one of plural operating reference voltage levels based on the bandwidth to communicate the information via the communication bus.

19. The system of claim 16 further comprising a universal serial bus.

20. The system of claim 16 further comprising a graphics processing module coupled to the communication bus and operable to process graphic information using one or more processors.

21. The system of claim 16 wherein the system comprises a graphics device.

22. The system of claim 16 wherein the system comprises an integrated circuit.

23. A system for optimizing operating conditions of an electronic device comprising:
means for determining bandwidth needed to support communicating information between one or more electronic devices based on whether an application is active;
means for determining an operating characteristic of at least one electronic device; and means for altering the operating characteristic of at least one electronic device to provide an operating level sufficient to provide the bandwidth wherein altering the operating characteristic includes altering an operating voltage level and a clock associated with a communication bus operable to communicate the information.

24. A computer readable medium embodying a program of computer instructions, the computer instructions comprising instructions to:
   determine bandwidth needed to support communicating information between one or more electronic devices based on whether an application is active;
   determine an operating characteristic of the at least one electronic device; and
   alter the operating characteristic of the at least one electronic device to provide an operating level sufficient to provide the bandwidth wherein altering the operating characteristic includes altering an operating voltage level and a clock associated with a communication bus operable to communicate the information.

25. The method of claim 10, wherein altering the operating characteristic further includes disabling a number of data lines associated with the communication bus.

* * * * *

UNITED STATES PATENT AND TRADEMARK OFFICE
CERTIFICATE OF CORRECTION

PATENT NO. : 7,392,411 B2 Page 1 of 1
APPLICATION NO. : 10/423290
DATED : June 24, 2008
INVENTOR(S) : Rajesh G. Shakkarwar It is certified that error appears in the above-identified patent and that said Letters Patent is hereby corrected as shown below:

Column No. 10, Line 33, after "," please add --the reference based on whether an application is active;--

Signed and Sealed this

Sixteenth Day of September, 2008

JON W. DUDAS
*Director of the United States Patent and Trademark Office*